(12) United States Patent
Betz et al.

(10) Patent No.: US 12,462,627 B2
(45) Date of Patent: Nov. 4, 2025

(54) METHOD FOR ASCERTAINING A CURRENT DISTANCE BETWEEN A MOTOR VEHICLE AND A MOBILE ELECTRONIC IDENTIFICATION DEVICE

(71) Applicant: MERCEDES-BENZ GROUP AG, Stuttgart (DE)

(72) Inventors: Konrad Betz, Stuttgart (DE); Matthias Reinhardt, Sindelfingen (DE); Özgür Mutlu, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 26 days.

(21) Appl. No.: 18/578,837

(22) PCT Filed: Jun. 8, 2022

(86) PCT No.: PCT/EP2022/065535
§ 371 (c)(1),
(2) Date: Jan. 12, 2024

(87) PCT Pub. No.: WO2023/285035
PCT Pub. Date: Jan. 19, 2023

(65) Prior Publication Data
US 2024/0321027 A1   Sep. 26, 2024

(30) Foreign Application Priority Data
Jul. 13, 2021 (DE) .......... 10 2021 003 617.4

(51) Int. Cl.
*G07C 9/00* (2020.01)
*G01S 5/02* (2010.01)
*H04W 4/40* (2018.01)

(52) U.S. Cl.
CPC ........ *G07C 9/00309* (2013.01); *G01S 5/0284* (2013.01); *H04W 4/40* (2018.02);
(Continued)

(58) Field of Classification Search
None
See application file for complete search history.

(56) References Cited

U.S. PATENT DOCUMENTS 10,252,699 B2    4/2019   Schoula et al.
10,328,898 B2 *  6/2019   Golsch ............... B60R 25/20
(Continued)

FOREIGN PATENT DOCUMENTS

DE   102017103187 A1   8/2017
DE   102017210523 B3   7/2018
(Continued)

OTHER PUBLICATIONS

International Search Report and Written Opinion mailed Sep. 27, 2022 in related/corresponding International Application No. PCT/EP2022/065535.
(Continued)

*Primary Examiner* — Carlos Garcia
(74) *Attorney, Agent, or Firm* — PATENT PORTFOLIO BUILDERS PLLC

(57) ABSTRACT

A method for determining the position of a mobile electronic identification device relative to a motor vehicle that can be unlocked by the identification device is provided. In a step a) at least one signal is transmitted from the motor vehicle to the identification device via the first communication connection, the signal containing the transmission time of the at least one signal. In a step b) the transmission time and reception time of the at least one signal received by the identification device is stored in the identification device. In a step c) a data packet is transmitted from the identification device to the motor vehicle via the second communication connection, said data packet containing the stored transmission and reception times of the signals transmitted in step a).

9 Claims, 1 Drawing Sheet

(52) U.S. Cl.
CPC .............. *G07C 2009/00412* (2013.01); *G07C 2209/63* (2013.01)

(56) References Cited

U.S. PATENT DOCUMENTS

| | | | | |
|---|---|---|---|---|
| 10,654,446 | B2* | 5/2020 | Golsch | G07C 9/00309 |
| 2011/0087370 | A1* | 4/2011 | Denison | G07C 9/27 |
| | | | | 221/9 |
| 2020/0062217 | A1 | 2/2020 | Ledvina et al. | |
| 2020/0118372 | A1* | 4/2020 | Stitt | H04W 12/08 |
| 2020/0305142 | A1 | 9/2020 | Jang et al. | |
| 2021/0179014 | A1* | 6/2021 | Hasegawa | H04B 17/27 |
| 2021/0179020 | A1 | 6/2021 | Hasegawa et al. | |
| 2023/0039407 | A1 | 2/2023 | Furuta et al. | |
| 2023/0161022 | A1* | 5/2023 | Kang | G01S 13/103 |
| | | | | 342/134 |
| 2024/0321027 | A1* | 9/2024 | Betz | H04W 4/40 |
| 2024/0323644 | A1* | 9/2024 | Betz | H04L 67/52 |
| 2024/0359658 | A1* | 10/2024 | Mutlu | B60R 25/24 |
| 2024/0361821 | A1* | 10/2024 | Yen | G06F 1/3215 |
| 2024/0375610 | A1* | 11/2024 | Betz | H04L 9/3234 |

FOREIGN PATENT DOCUMENTS

| | | |
|---|---|---|
| DE | 102017222824 A1 | 6/2019 |
| JP | 2016038332 A | 3/2016 |
| JP | 2021096143 A | 6/2021 |
| WO | 2021064102 A1 | 4/2021 |
| WO | 2021131137 A1 | 7/2021 |

OTHER PUBLICATIONS

Office Action created Apr. 26, 2022 in related/corresponding DE Application No. 10 2021 003 617.4.
Office Action dated Feb. 12, 2025 in related/corresponding JP Application No. 2024-501492.
Office Action dated Aug. 26, 2025 in related/corresponding JP Application No. 2024-501492.

* cited by examiner

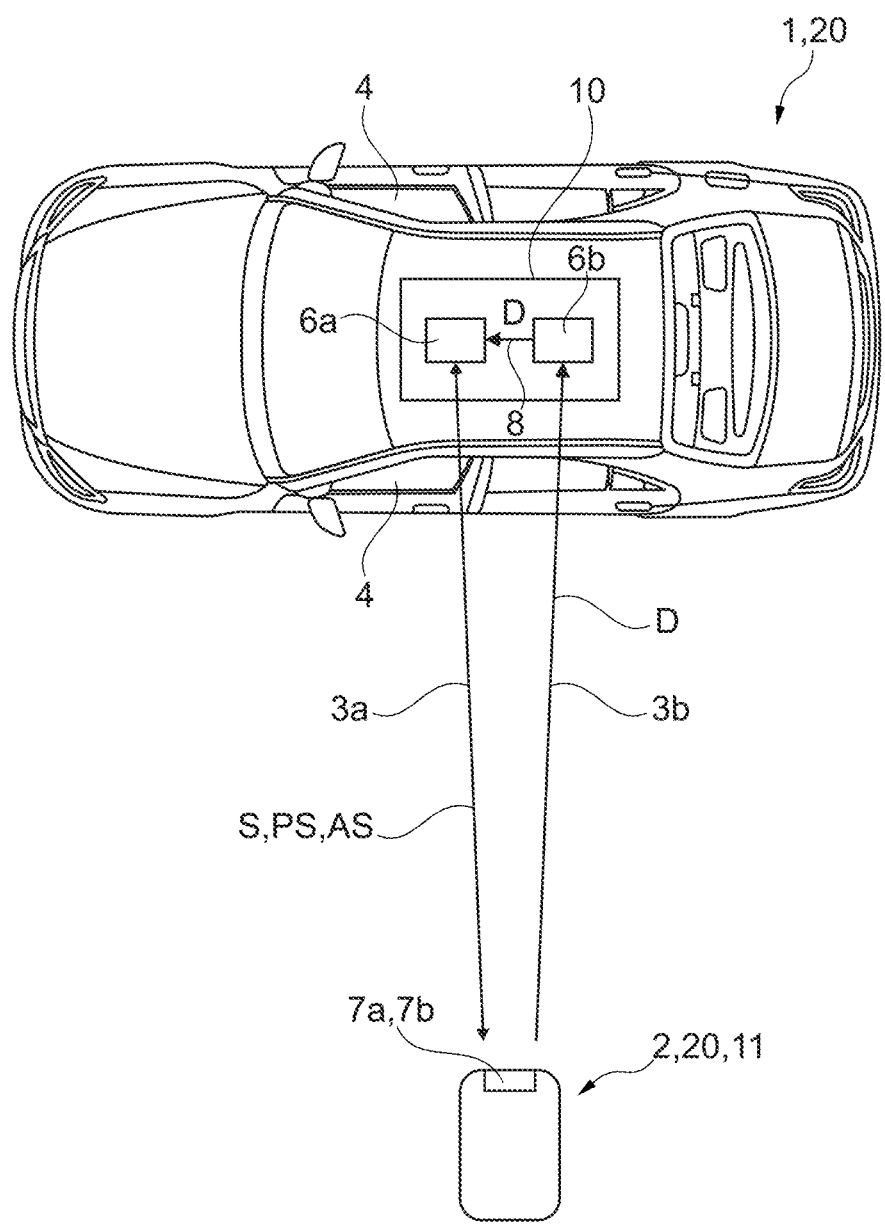

METHOD FOR ASCERTAINING A CURRENT DISTANCE BETWEEN A MOTOR VEHICLE AND A MOBILE ELECTRONIC IDENTIFICATION DEVICE

BACKGROUND AND SUMMARY OF THE INVENTION

Exemplary embodiments of the invention relate to a method for ascertaining a current distance between a motor vehicle and a mobile electronic identification device, as well as to an arrangement comprising a vehicle and an identification device which is set up/programmed to carry out this method.

Mobile electronic identification devices are used in order to enable the authorization for access to a motor vehicle, as an alternative to the mechanical key. Generally, radio systems in the low-frequency range are used for communication between the identification device and the motor vehicle. Thus, authentication data can be wirelessly transmitted, and in particular access authorizations can be checked. In this context, the use of a radio connection according to the so-called UWB (ultra-wideband) standard is known. It is not only possible to transmit authorization data between the identification device and the motor vehicle by means of a communication connection of this type according to the UWB standard. Such a UWB connection also enables a current distance between the identification device and the motor vehicle to be ascertained with relatively high accuracy.

Common methods can be applied for this purpose, for example so-called "polling". These methods are based on using signals sent from the identification device to the motor vehicle, or vice-versa from the motor vehicle to the identification device, to determine the signal propagation time necessary for the signal transmission, and using this signal propagation time to calculate the distance between the motor vehicle and the identification device.

Such an authorization method with distance ascertainment is described in DE 10 2017 103 187 A1.

A disadvantage in this case is that data in relation to the signal propagation time of the UWB signals—typically in the form of so-called time stamps, which characterize the transmission and reception time of each UWB signal—has to be transmitted from the identification device to the motor vehicle in order to determine the distance.

However, the transmission of all of these time stamps via the UWB connection proves to be problematic due to the size of the resultant data packet, as the transmission power from the identification device to the motor vehicle often has to be reduced due to a "link budget" for data transmission that is only limited on the basis of regulatory reasons. This can lead to the aforementioned data being incompletely transmitted to the motor vehicle.

Thus, exemplary embodiments of the present invention are directed to an improved method in which the above-mentioned problem is taken into account.

The basic concept of the invention is to carry out signal propagation time measurements via a UWB connection between a motor vehicle and identification device for the above-mentioned authorization and determination of the distance—as is known from conventional methods—and to store the times required for this in the identification device—also known to the person skilled in the art by the name "time stamp".

However, in the method presented here, it is essential to the invention that a data packet containing the time stamp is transmitted to the vehicle not via a UWB connection, but by an additional existing BLE connection, after the aforementioned signals have been transmitted via the UWB connection for ascertaining the propagation time. Since such a BLE connection is not subject to the above-mentioned restrictions of the UWB connection in relation to the link budget and transmission power, the aforementioned time stamps can also be transmitted securely and completely in the form of a relatively large data packet from the identification device to the motor vehicle and evaluated therein to determine the distance. In this manner, a reliable and highly accurate ascertainment of the distance between identification device and motor vehicle is possible.

The method according to the invention serves to determine the distance of a mobile electronic identification device in relation to a motor vehicle that can be unlocked by means of this identification device. The identification device communicates with the motor vehicle so as to transmit data, both via a first wireless communication connection, which operates according to the UWB standard, and also by means of a second wireless communication connection, which operates according to the BLE standard. Preferably, a maximum range of the first communication connection is shorter than a maximum range of the second communication connection.

The method according to the invention comprises three steps a), b) and c). In step a), at least one signal is transmitted from the motor vehicle to the identification device via the first communication connection, the signal containing the transmission time of this signal. Preferably, multiple signals of this type can be transmitted successively. In step b), the respective transmission and reception time of the signal or signals received by the identification device is, or are, stored in the identification device. In a further step c), a data packet is transmitted from the identification device to the motor vehicle by means of the second communication connection, the data packet containing the stored transmission and reception times of the signal or signals transmitted in step a). This information can be used later for calculating the distance between the identification device and motor vehicle at the time of the signal transmission. In principle, this is effected by determining the difference between the reception time and transmission time. This difference corresponds to the time span necessary for the transmission of the signal. From this time span, the distance between the identification device and the motor vehicle at the time of the signal transmission can in turn be calculated in an easy manner.

According to a preferred embodiment, the method according to the invention comprises an additional step d), following on from step c), according to which a current distance between the identification device and the motor vehicle is ascertained from the data packet transmitted to the motor vehicle in step c). Thus, the distance between the identification device and the motor vehicle can be determined with very high accuracy by means of the method according to the invention.

A "polling" procedure can be expediently used for performing steps a) and b). By means of such a polling procedure, signal propagation times of signals transmitted via the first communication connection between the identification device and the motor vehicle can easily be determined. This signal propagation time can in turn be used later for ascertaining the distance between the identification device and the motor vehicle.

Particularly expediently, to carry out such a polling method, in step b), a polling signal can be sent from the identification device to the motor vehicle via the first communication connection. In response to this polling signal, at least one answer signal is transmitted with the transmission time of this answer signal from the motor vehicle—likewise via the first communication connection—to the identification device. The reception time, at which the answer signal was received, can be stored by the identification device. Both times—transmission time and reception time—can thus be added to the data packet to be transmitted to the motor vehicle. Thus, the data packet to be transmitted from the identification device to the motor vehicle by means of the second communication connection contains the transmission time and a reception time of the answer signal.

If exactly one answer signal is transmitted in response to the polling signal, this procedure is also known as the "ping-pong" procedure.

Particularly preferably, in step b), in response to the polling signal, two or more answer signals are, however, transmitted successively to the identification device via the first communication connection. In this variation, for each answer signal, a respective transmission time and a respective reception time of the answer signal is added to the data packet to be transmitted from the identification device to the motor vehicle via the second communication connection. Due to transmission of two or more such answer signals with respective time stamps, the transmission time necessary for the signal transmission can be determined later particularly accurately. Thus, the distance between the motor vehicle and the identification device can also be calculated particularly accurately.

In an advantageous development of the method according to the invention, the transmission time and the reception time of the polling signal can also be added to the data packet. In this manner, the signal propagation time of the polling signal can be taken into account for later calculation of the distance. In this manner, the accuracy is further increased by means of which the distance between the identification device and vehicle can be ascertained.

The transmission of the data packet carried out in step c) via the second communication connection can preferably be encrypted. Thus, security-critical authorization data can also be added to this data packet which serves to authorize access to the motor vehicle.

Exemplary embodiments of the invention also relate to an arrangement comprising a motor vehicle and a mobile electronic identification device which communicates or can communicate with the motor vehicle by means of a first wireless communication connection, according to the UWB standard, and by means of a second wireless communication connection, according to the BLE standard. For this purpose, the motor vehicle comprises a transmission and reception system for wireless data transmission with the identification device via the two communication connections, wherein the transmission and reception system is set up/programmed to carry out the method according to the invention. The above-mentioned advantages of the method according to the invention explained above therefore also apply to the arrangement according to the invention.

According to a preferred embodiment, the transmission and reception system comprises a first transmission and reception device for transmitting and receiving data via the first communication connection and a second transmission and reception device for transmitting and receiving data via the second communication connection. The first transmission and reception device and the second transmission and reception device are connected with each other so as to transmit data via a suitable—preferably wired—communication connection such that the signal propagation time received by the second transmission and reception device can be transmitted to the first transmission and reception device for processing.

According to a preferred embodiment, the electronic identification device is part of a smartphone or is formed by a smartphone. Such a smartphone often already has transmission and reception units based on the UWB and BLE standards installed as standard.

Further important features and advantages of the invention result from the drawings and the corresponding description of the figures based on the drawing.

It is understood that the features that are mentioned above and are still to be explained below are not only able to be used in the respectively specified combination, but also in other combinations or individually, without exceeding the scope of the present invention.

BRIEF DESCRIPTION OF THE SOLE DRAWING

Preferred exemplary embodiments of the invention are depicted in the drawing and explained in greater detail in the description below, wherein the same reference numerals refer to the same or similar or functionally identical components.

The sole drawing illustrates an example of an arrangement according to the invention in a top view.

DETAILED DESCRIPTION

The sole FIGURE illustrates an example of an arrangement 20 according to the invention in a top view. The arrangement 20 comprises a motor vehicle 1 with vehicle doors 4, via which access into a passenger compartment of the motor vehicle 1 is possible. The motor vehicle 1 comprises a transmission and reception system 10 for wireless data transmission that is set up/programmed to carry out the method according to the invention. The transmission and reception system 10 for wireless data transmission can be a control unit connected to a field bus, such as a LIN or CAN bus, in the motor vehicle 1. Furthermore, the arrangement 20 comprises a mobile electronic identification device 2. The electronic identification device 2 can be a part of a smartphone 11 or can be formed by a smartphone 11. The identification device 2 enables automatic authorization to access the motor vehicle 1 as a result of the identification device 2 approaching the motor vehicle 1. In particular, the vehicle doors 4 can be unlocked after successful authorization.

The mobile identification device 2 can communicate with the transmission and reception system 10 of the motor vehicle 1 by means of a first wireless communication connection 3a, according to the UWB standard, and by means of a second wireless communication connection 3b, according to the BLE standard. For this purpose, a first transmission and reception device 6a, which can communicate so as to transmit data via the first communication connection 3a with a corresponding first transmission and reception device 7a in the identification device 2, can be provided in the motor vehicle 1 as a part of the transmission and reception system 10. Correspondingly, a second transmission and reception device 6b, which can communicate so as to transmit data via the second communication connection 3b with a corresponding second transmission and reception device 7b in the identification device 2, can be provided in the motor vehicle 1.

In the example, a first maximum range of the first communication connection 3a from the motor vehicle 1 to the identification transmitter 2, measured from the motor vehicle 1, is less than a second maximum range of the second communication connection 3b, also measured from the motor vehicle 1. The first transmission and reception device 6a and the second transmission and reception device 6b of the motor vehicle 1 can be connected with each other so as to transmit data via a wired communication connection 8.

In the following, the method according to the invention is explained by way of example according to the sole drawing.

The method comprises three steps a), b) and c). In step a), multiple signals S are transmitted successively from the motor vehicle 1 via the first communication connection 3a to the identification device 2, said signals containing the transmission time of each signal S.

According to step b), the respective transmission times of the signals S received by the identification device, as well as the reception times of these signals S—determined by the identification device 2—are stored in the identification device 2.

In step c), a data packet D is transmitted from the identification device 2 to the motor vehicle 1 by means of the second communication connection 3b, said data packet containing the transmission and reception times, stored in step b), of the signals S transmitted in step a).

A so-called "polling" procedure can be used to carry out steps a) and b). For this purpose, in step b), a polling signal PS is transmitted from the first transmission and reception device 7a of the identification device 2 via the first communication connection 3a to the first transmission and reception unit 6a of the motor vehicle 1. In response to this polling signal PS, multiple answer signals AS are transmitted successively from the first transmission and reception unit 6a of the motor vehicle 1—likewise via the first communication connection 3a—to the first transmission and reception unit 7a of the identification device 2, with a transmission time stamp of each answer signal AS.

In this case, for each answer signal AS, a respective transmission time and a respective reception time of the answer signal AS are added to the data packet D to be transmitted from the second transmission and reception unit 7b of the identification device 2 to the second transmission and reception unit 6b of the motor vehicle 1 via the second communication connection 3b. Thus, the data packet D transmitted from the identification device 2 to the motor vehicle 1 via the second communication connection 3b contains the associated transmission time and associated reception time for each generated answer signal AS and also for the polling signal PS that triggers the answer signal AS.

In an additional step d), following on from step c), a current distance between the identification device 2 and the motor vehicle 1 is calculated by the motor vehicle 1 from the data packet D, transmitted to the motor vehicle 1 in step c), containing the transmission and reception times. This calculation can take place in the first transmission and reception unit 6a. Therefore, the data packet D received by the second transmission and reception unit 6b of the transmission and reception system 10 of the motor vehicle 1 can be transmitted via the wired communication connection 8 to the first transmission and reception device 6a of the transmission and reception system 10, where it can be processed to calculate the sought distance between the identification device 2 and the motor vehicle 1.

The transmission of the data packet D carried out in step c) via the second communication connection 3b can be encrypted. Thus, security-critical authorization data can also be added to the data packet D, which serves for authorizing access to the motor vehicle 1 by the identification device 2.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method, comprising:
a) transmitting, from a first transmission and reception device of a transmission and reception system of a motor vehicle to an identification device via a first wireless communication connection, at least one signal containing a transmission time of the at least one signal;
b) storing, in the identification device, the transmission time and a reception time of the at least one signal received by the identification device; and
c1) transmitting, from the identification device to the motor vehicle via a second wireless communication connection, a data packet the transmission and reception time of the at least one signal transmitted in step a);
c2) receiving, by a second transmission and reception device of the transmission and reception system of the motor vehicle, the data packet transmitted from the identification device;
c3) transmitting, by the second transmission and reception device of the transmission and reception system of the motor vehicle via a wired communication connection to the first transmission and reception device of the transmission and reception system of the motor vehicle, the received data packet transmitted from the identification device; and
d) determining, by the first transmission and reception device of the transmission and reception system of the motor vehicle, a current distance between the identification device and the motor vehicle based on the transmission and reception time of the received data packet transmitted from the identification device,
wherein the motor vehicle is unlockable by the identification device,
wherein the first wireless communication connection operates according to a UWB standard and the second wireless communication connection operates according to the BLE standard, and
wherein a maximum range of the first communication connection is shorter than a maximum range of the second communication connection.

2. The method of claim 1, wherein the data packet is encrypted prior to transmission in step c).

3. The method of claim 1, wherein a polling procedure is used for performing steps a) and b).

4. The method of claim 3, wherein in step b):
a polling signal is sent from the identification device to the motor vehicle via the first communication connection,
responsive to the polling signal, at least one answer signal is transmitted with a transmission time of the answer signal from the motor vehicle to the identification device via the first communication connection, and
the transmission time of the answer signal and a reception time of the answer signal in the identification device are added to the data packet to be transmitted from the identification device to the motor vehicle via the second communication connection.

5. The method of claim 4, wherein in step b):
in response to the polling signal, two or more answer signals are transmitted successively to the identification device via the first communication connection, and
for each received answer signal, a respective transmission time and a respective reception time of the answer signal is added to the data packet to be transmitted from the identification device to the motor vehicle via the second communication connection.

6. The method of claim 5, wherein a transmission time and a reception time of the polling signal is also added to the data packet.

7. A system comprising:
a motor vehicle comprising a transmission and reception system configured for wireless data transmission; and
a mobile electronic identification device configured to communicate with the transmission and reception system of the motor vehicle,
wherein the mobile electronic identification device is configured to
receive, from the motor vehicle via a first wireless communication connection, at least one signal containing a transmission time of the at least one signal;
store the transmission time and a reception time of the at least one signal received by the mobile electronic identification device; and
transmit, to the motor vehicle via a second wireless communication connection, a data packet the transmission and reception time of the transmitted at least one signal,
wherein the motor vehicle is unlockable by the mobile electronic identification device,
wherein the first wireless communication connection operates according to a UWB standard and the second wireless communication connection operates according to the BLE standard,
wherein a maximum range of the first communication connection is shorter than a maximum range of the second communication connection,
wherein the transmission and reception system comprises a first transmission and reception device configured to transmit and receive data via the first communication connection and a second transmission and reception device configured to transmit and receive data via the second communication connection, and
wherein the first transmission and reception device and the second transmission and reception device are connected with each other so as to transmit data via a wired communication connection such that the data packet received by the second transmission and reception device of the transmission and reception system is transmittable to the first transmission and reception device for processing.

8. The system of claim 7, wherein the mobile electronic identification device is part of a smartphone or is a smartphone.

9. The system of claim 7, wherein the first transmission and reception device of the motor vehicle is configured to determine a current distance between the mobile electronic identification device and the motor vehicle based on the data packet received by the second transmission and reception device of the vehicle.

* * * * *